(No Model.)
T. ALLSOP & E. NICE.
MUSIC LEAF TURNER.
No. 426,899.              Patented Apr. 29, 1890.
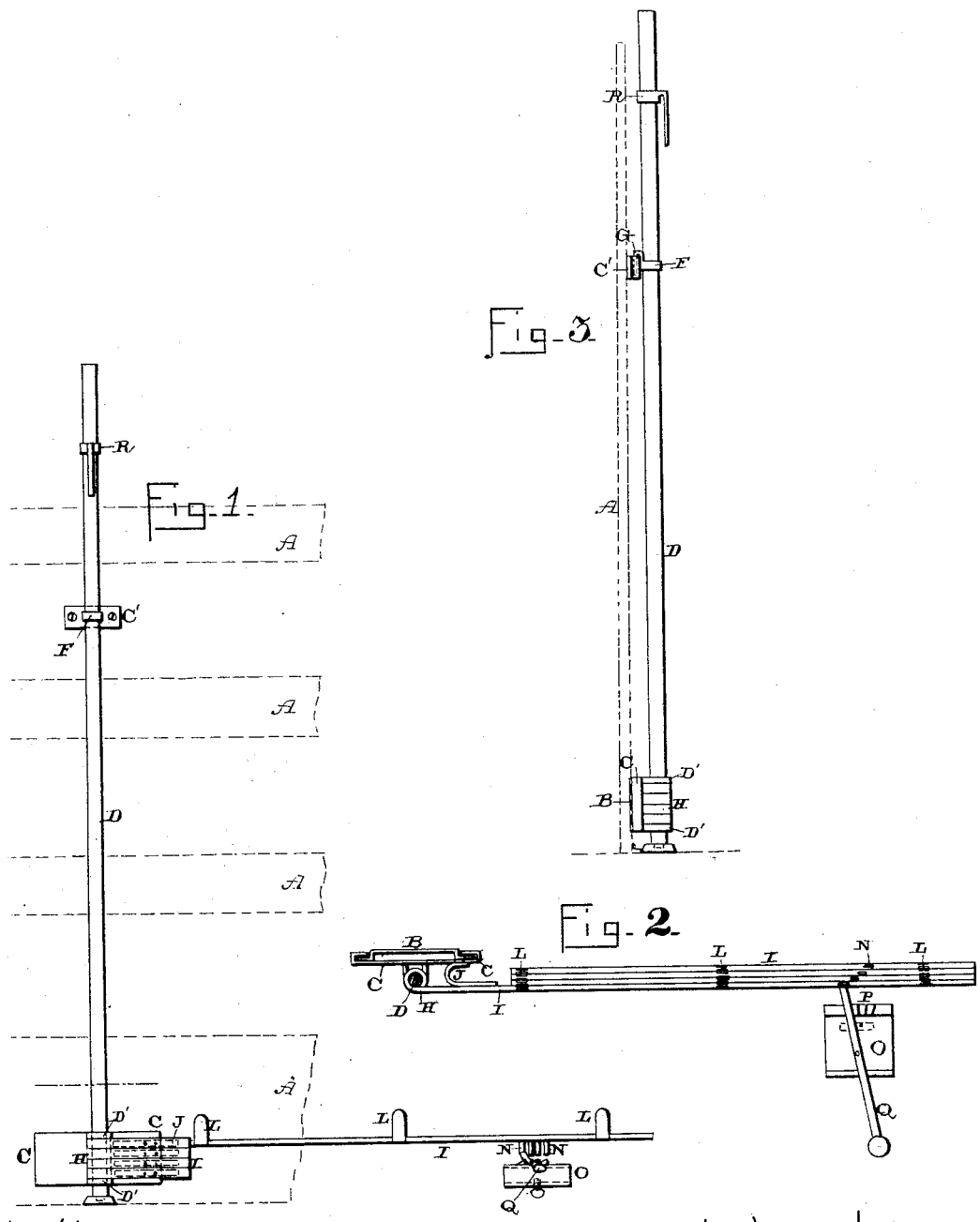
Witnesses:
E. P. Ellis,
L. J. Magie
Inventors:
Thos. Allsop,
Eugene Nice,
per
F. A. Lehmann, Atty.

UNITED STATES PATENT OFFICE.

THOMAS ALLSOP AND EUGENE NICE, OF PHILADELPHIA, PENNSYLVANIA.

MUSIC-LEAF TURNER.

SPECIFICATION forming part of Letters Patent No. 426,899, dated April 29, 1890.

Application filed December 7, 1889. Serial No. 332,874. (No model.)

*To all whom it may concern:*

Be it known that we, THOMAS ALLSOP and EUGENE NICE, of Philadelphia, in the county of Philadelphia and State of Pennsylvania, have invented certain new and useful Improvements in Music-Leaf Turners; and we do hereby declare the following to be a full, clear, and exact description of the invention, such as will enable others skilled in the art to which it pertains to make and use it, reference being had to the accompanying drawings, which form part of this specification.

Our invention relates to an improvement in music-leaf turners; and it consists in the combination of a rod which is attached to the book or music rest, a series of collars placed on its lower end and provided with arms which engage with the lower edges of the sheets of music, springs for moving the arms when they are left free to move, and an operating-lever by which the arms are successively released, as will be more fully described hereinafter.

The object of our invention is to produce a music-leaf turner by means of which the musician can quickly turn the leaves of music by merely touching a little lever, and thus avoid the usual interruptions which occur when each leaf has to be turned by hand.

Figure 1 is a side elevation of a music-leaf turner which embodies our invention. Fig. 2 is a horizontal section of the same. Fig. 3 is a detail view of the same.

A represents the ordinary book-support or music-holder, and to which the two plates B C are secured at any suitable point. The ends of the plate B are made L-shaped, so that the ends of the plate C, to which the rod D is secured at its lower end, can be made to catch behind the plate B, as shown in Fig. 2. By this construction the plate B is permanently attached to the book-holder or music-support, and the plate C, carrying the rod D, and all of the parts of the leaf-turner can be detached from and returned to position upon the part A whenever so desired. The lower end of the rod D, which extends upward any suitable distance, is secured by means of the bands or collars D' directly to the plate C, and the lower end of this rod projects down below the plate C sufficiently far to rest upon the ledge of the piano above the bank of keys. Placed upon this rod D near its upper end is a collar F, which is provided with a hook G, and this hook G extends up and hooks inside of the plate C', which has a grooved or bent part at its center for this purpose. This collar F is vertically adjustable upon the rod D, and hence the plate C' can be attached to any part of the music-holder A that may be preferred.

Placed upon the lower end of the rod D in between the collars D' are a number of collars or sleeves H, to which the arms I are secured. These arms are shaped, as shown in Fig. 2, so that one will rest directly behind the other.

Secured to the plate C is a curved spring J for each one of the arms I, and this spring, as soon as the arm I is left free to move, swings the arm, which is provided with clips or fastenings L of any kind to attach it to the sheet of music, around to the other side of the rod D. Each one of these arms I is provided with a projection or stop N, which extends vertically downward, and the several stops N are arranged in the relation to each other as shown.

Placed upon the ledge of the piano is a plate O, and upon the inner edge of this plate are formed a suitable number of ratchet-teeth P, corresponding in number to the number of arms I. Pivoted upon this plate near its outer edge is an operating-lever Q, which has its inner end to alternately catch over or against one of the projections N, so as to hold the arms to which the sheets of music are attached in position until the operator is ready to have them turned. As soon as he wishes one of the sheets turned he has but to reach up and touch the outer end of the lever Q, so as to move it from one ratchet P to the other, and as soon as this lever is moved from in front of one of the projections N the corresponding spring J causes the arm to swing around to the other side of the rod D, turning its corresponding sheet of music.

For the purpose of attaching the rod D to the center of the book or music it is provided with a sliding collar R, to which a spring-hook or other device is attached, and which hook catches over the center of the book or music for the purpose of holding it stationary at this point.

It will be seen that the parts which constitute this music-leaf turner are very few, simple, and durable and not liable to get out of order, and that the whole device can be attached to or removed from the piano whenever so desired.

Having thus described our invention, we claim—

1. The combination of the rod D, the plate C, secured thereto, and the collar F, provided with the hook G, with the plates B C', which are secured to the music-support, whereby the leaf-turner can be secured to and removed from the part A, substantially as shown.

2. The combination, with the rod D and the plate C, secured thereto, of the springs J, the arms I, the clips or holding devices L, the projections N, the pivoted lever Q, and the plate O, provided with teeth, substantially as described.

In testimony whereof we affix our signatures in presence of two witnesses.

THOMAS ALLSOP.
     EUGENE NICE.

Witnesses:
 HOWARD VAN COURT,
 CLARENCE GOLDENBERG.